(12) United States Patent
Kim

(10) Patent No.: US 9,148,199 B2
(45) Date of Patent: Sep. 29, 2015

(54) PREQUALIFICATION OF VECTORING BEFORE IMPLEMENTATION

(71) Applicant: Fluke Corporation, Everett, WA (US)

(72) Inventor: Wonoh Kim, Johns Creek, GA (US)

(73) Assignee: Fluke Corporation, Everett, WA (US)

( * ) Notice: Subject to any disclaimer, the term of this patent is extended or adjusted under 35 U.S.C. 154(b) by 291 days.

(21) Appl. No.: 13/854,746

(22) Filed: Apr. 1, 2013

(65) Prior Publication Data

US 2014/0294054 A1 Oct. 2, 2014

(51) Int. Cl.
*H04B 3/32* (2006.01)
*H04M 11/06* (2006.01)
*H04B 3/487* (2015.01)

(52) U.S. Cl.
CPC .................. *H04B 3/32* (2013.01); *H04B 3/487* (2015.01); *H04M 11/062* (2013.01)

(58) Field of Classification Search
CPC .................................. H04B 3/32; H04B 3/487
USPC ............. 370/201, 225; 379/22, 27.01, 406.01
See application file for complete search history.

(56) References Cited

U.S. PATENT DOCUMENTS

| | | | | |
|---|---|---|---|---|
| 6,510,184 B1 * | 1/2003 | Okamura | .................... | 375/260 |
| 6,633,545 B1 * | 10/2003 | Milbrandt | .................... | 370/252 |
| 6,650,697 B1 * | 11/2003 | Tate et al. | .................... | 375/222 |
| 6,819,746 B1 | 11/2004 | Schneider et al. | | |
| 6,970,560 B1 * | 11/2005 | Hench et al. | .................... | 379/417 |
| 7,126,995 B2 * | 10/2006 | Miyoshi et al. | .................... | 375/259 |
| 7,242,761 B1 * | 7/2007 | Milbrandt | .................... | 379/399.01 |
| 7,898,975 B2 * | 3/2011 | Shi | .................... | 370/252 |
| 8,254,471 B2 * | 8/2012 | Fang | .................... | 375/257 |
| 8,537,973 B2 * | 9/2013 | Berg et al. | .................... | 379/22.08 |
| 8,767,809 B2 * | 7/2014 | Berg et al. | .................... | 375/224 |
| 8,824,265 B2 * | 9/2014 | Maes et al. | .................... | 370/201 |
| 2003/0112858 A1 * | 6/2003 | Wang | .................... | 375/222 |
| 2005/0026572 A1 * | 2/2005 | Dasgupta et al. | .................... | 455/114.2 |
| 2005/0053229 A1 * | 3/2005 | Tsatsanis et al. | .................... | 379/406.01 |
| 2006/0039456 A1 * | 2/2006 | Bostoen et al. | .................... | 375/222 |
| 2007/0274404 A1 * | 11/2007 | Papandriopoulos et al. | . | 375/260 |
| 2008/0316937 A1 * | 12/2008 | Shi | .................... | 370/252 |
| 2009/0034554 A1 * | 2/2009 | Evans et al. | .................... | 370/468 |
| 2011/0096870 A1 * | 4/2011 | Schenk et al. | .................... | 375/296 |
| 2011/0261674 A1 * | 10/2011 | Maes et al. | .................... | 370/201 |
| 2012/0093204 A1 * | 4/2012 | Al-Dhahir et al. | .................... | 375/222 |
| 2012/0155618 A1 | 6/2012 | Hart et al. | | |

(Continued)

OTHER PUBLICATIONS

Nortel Networks, "Near-End and Far-End Crosstalk Statistical Models", T1E1.4, Spectral Compatibility Standards Project, Clearwater, Florida, Dec. 6-10, 1999.

(Continued)

*Primary Examiner* — Edan Orgad
*Assistant Examiner* — Emmanuel Maglo
(74) *Attorney, Agent, or Firm* — Locke Lord LLP; Scott D. Wofsy; Christopher J. Capelli

(57) ABSTRACT

A prequalification determination is made on a DSL line to predict the bit rate improvement that might be accomplished by implementation of vectoring, providing information to use in determining whether or not to implement vectoring. Overall noise is measured on the line, along with FEXT noise, and the FEXT noise is subtracted from the overall noise, and the resulting value is employed to determine a predicted bit rate, providing an indication of the potential bit rate if vectoring is implemented.

16 Claims, 3 Drawing Sheets

(56) References Cited

U.S. PATENT DOCUMENTS

| | | | |
|---|---|---|---|
| 2012/0201286 A1* | 8/2012 | Pons et al. | 375/227 |
| 2012/0219123 A1* | 8/2012 | Berg et al. | 379/27.01 |
| 2013/0010931 A1* | 1/2013 | Berg et al. | 379/22 |

OTHER PUBLICATIONS

A.G. Ivahnenko, Polynomial theory of complex systems, IEEE Trans. Syst. Man Cybern., pp. 364-378, SMC-1, 1971.

M.Sugeno and G.T.Kang, "Structure identification of fuzzy model", Fuzzy Sets and Systems, vol. 28, pp. 15-33, 1988.

Wonoh Kim, "Hierarchical Control System with Statistical Process Control and Soft Computing", Ph.D Dissertation Proposal, School of Electrical and Computer Engineering, Georgia Institute of Technology, 2000.

Wonoh Kim and George Vachtsevanos, "Hierarchical Process Control by Combining SPC and Soft Computing Methods", 19th Int. Conf. of the North American Fuzzy Information Processing Society (NAFIPS 2000), pp. 485-489, 2000.

Wonoh Kim et al., "Fuzzy Logic Ratio Control for a CVT Hydraulic Module", Proc. IEEE Int. Symp. on Intelligent Control, pp. 151-156, 2000.

Wonoh Kim et al., "Autonomous Vehicles, From Flight Control to Mission Planning using Fuzzy Logic Techniques", 13th Int. Conf. on Digital Signal Processing Proceedings (DSP 97), vol. 2, pp. 977-981, 1997.

"Self-FEXT cancellation (vectoring) for use with VDSL2 transceivers", Series G: Transmission Systems and Media, Digital Systems and Networks—Digital sections and digital line system—Access networks, Recommendation ITU-T G.993.5, Geneva, 2010.

Sanjay S. Patel, "Next Generation Access: 10G PON & Phantom Mode . . . The Evolution Towards Ultra-Broadband", Alcatel-Lucent. CeBit 2011.

Richard Loveland, "It's Not a Dream—It's Real—VDSL2 Vectoring in the Real World", OSP Magazine, Jan. 2012.

Michael Peters and Stefaan Vanhastel, "The Copper Phantom", OSP Magazine, Jan. 2011.

Stefaan Vanhastel and Wim Van Daele, "VDSL2: Turning Copper into Gold", OSP Magazine, Apr. 2010.

Extended European Search Report dated Jul. 28, 2015 for European Patent Application No. 14162914.7.

* cited by examiner

Premise part | Consequent part

PREQUALIFICATION OF VECTORING BEFORE IMPLEMENTATION

BACKGROUND

This disclosure relates to prequalification of Digital Subscriber Line (DSL), and more particularly to estimating the effect of implementing vectoring at a prequalification stage.

DSL is a technology that transmits data over a local telephone network and prequalification is a procedure to detect conditions and estimate performance of data transmission, such as bitrate, on the line.

The performance of the DSL is affected by noise such as Near-End Crosstalk (NEXT), Far-End Crosstalk (FEXT), impulse and white noise.

Vectoring is a transmission method that employs the coordination of line signals to provide cancelling and reducing of FEXT levels and improvement of performance. To implement vectoring and conditioning of the signal, extra devices need to be implemented in the Access Node (AN) located at a Central Office (CO). Vectoring requires implementation of a heavy signal processing to cancel FEXT noise.

Though vectoring cancels FEXT and greatly improves rate and reach performance, vectoring cannot achieve full improvement when there are non-vectored lines or lines form separate vector group.

SUMMARY

In accordance with the disclosure, a prequalification determination is made on a DSL line to predict the bit rate improvement that might be accomplished by implementation of vectoring, thus assisting in deciding whether or not to implement vectoring in an individual situation.

Accordingly, it is an advantage of the present disclosure to provide an improved method and apparatus for predicting bit rate improvement that might be had by implementing vectoring.

It is a further advantage of the present disclosure to provide an improved tool to help with a decision to implement vectoring.

Since vectoring cannot perform fully with the co-existence of non-vectored lines, it is a further advantage of the disclosure to employ a reference model that includes the effect of co-existence of non-vectored lines and gives accurate prediction of DSL performance by the expected numbers of vectoring and non-vectoring lines.

The subject matter of the present technology is particularly pointed out and distinctly claimed in the concluding portion of this specification. However, both the organization and method of operation, together with further advantages and embodiments thereof, may best be understood by reference to the following description taken in connection with accompanying drawings wherein like reference characters refer to like elements.

DETAILED DESCRIPTION

The system according to a preferred embodiment of the present disclosure comprises measurement instrument capable of measuring network performance including determining overall noise, and determining FEXT noise; and a system that can predict the effect of FEXT noise cancellation and calculate bit rates with vectoring (FEXT noise cancelled) and without vectoring.

Figure 1:
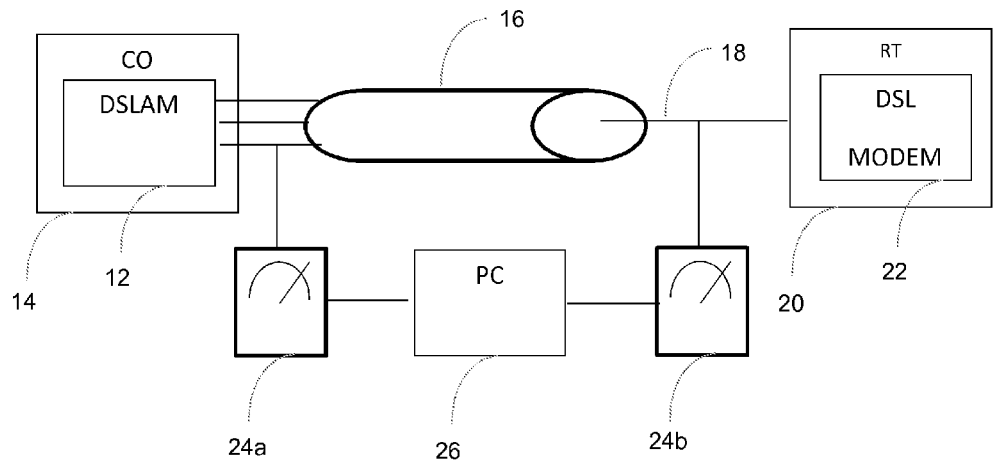
FIGS. 1 and 2 are block diagrams of a network model for vectored system with instrument for prequalification.

Referring to FIG. 1, a block diagram of a network model for vectored system with instrument for prequalification, to implement DSL, Digital Subscriber Line Access Multiplexer (DSLAM) 12 needs to be implemented at a Central Office (CO) site, 14. Cables 16 contain copper line(s) 18 to each Remote Terminal (RT) 20 that contains a DSL Modem 22. Test instrument 24 comprises components 24a and 24b located at both CO and RT sites to measure both NEXT noise at CO site and FEXT noise at RT site of the subscribed line. The test instrument may be connected to PC 26 to upload and download, store, and manipulate data.

Figure 2:
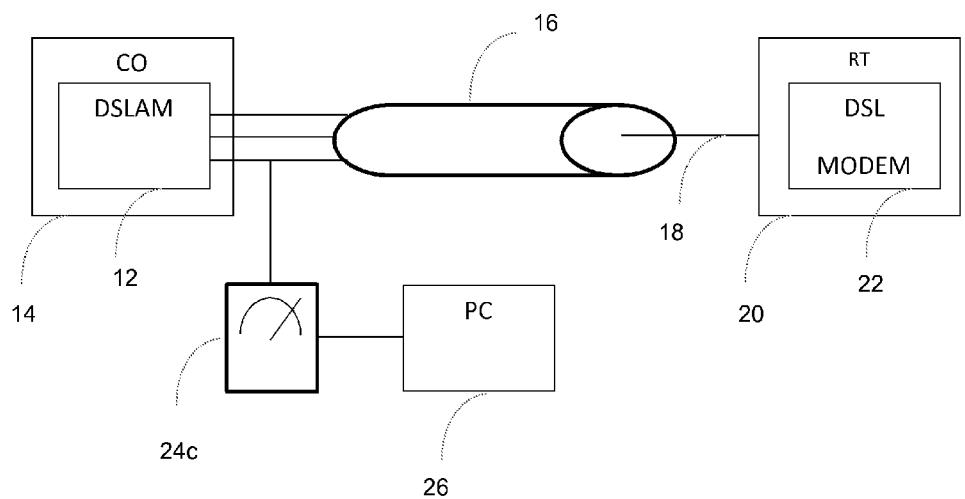

Referring to FIG. 2, alternatively, the test instrument 24c can be located at only CO site 14 to measure NEXT only. In this case, the FEXT noise can be estimated using the NEXT noise measurement.

Figure 3:
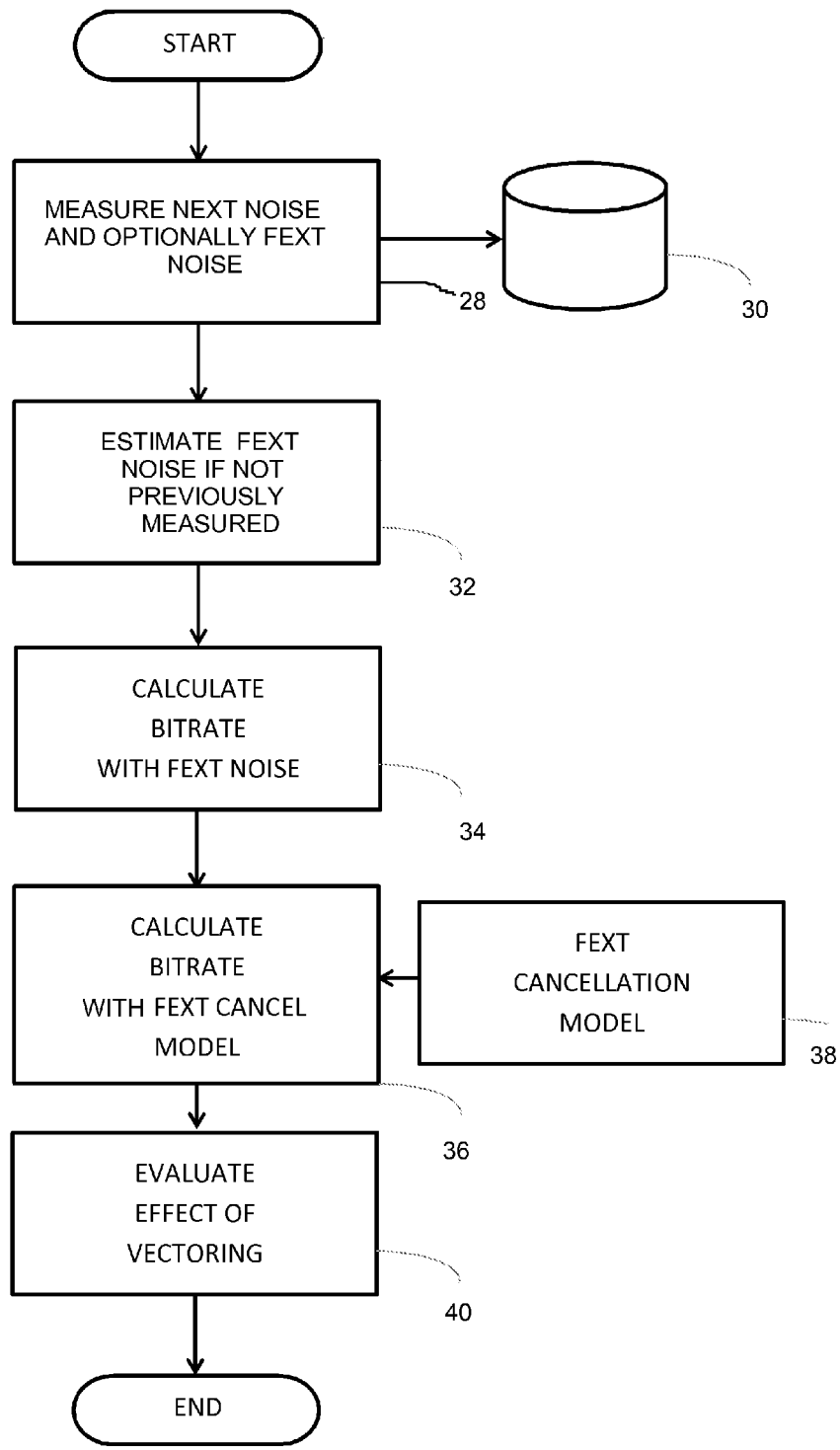
FIG. 3 is a flow chart of the operational steps.

Referring to FIG. 3, the operational steps performed by the instrument are described, wherein operation begins with a first step 28, wherein NEXT noise at CO site 14 and optionally FEXT noise at RT site 20 are measured. The measurement instrument not only measures noise but also performs metallic testing including measurement of attenuation, wideband longitudinal balance and bridge tap detection to measure metallic conditions that will affect to the DSL performance. The measured data is stored in storage 30, located in either in the measurement instrument 24 or in PC 26 (via an external link). FEXT noise can be measured either at RT site 20 by use of Dual End Line Test (DELT) in step 28 as in FIG. 1 or can be estimated in step 32 as in FIG. 2 from the NEXT noise measurement at CO site 14 by Single End Line Test (SELT). FEXT noise is estimated with attenuation, wide band longitudinal and the NEXT noise measurement data. The instrument 24 calculates precise FEXT noise with the NEXT noise and metallic conditions (length and wideband longitudinal balance data).

Next, step 34, as one of the performance matrix of DSL, bitrate is calculated with attenuation, wide band longitudinal balance, and noise information. The noise information included is both the NEXT and FEXT noise measurement (or estimated FEXT noise).

Then, step 36, bitrate is calculated with the FEXT noise cancellation from the FEXT Cancellation Model 38 that emulates the FEXT cancellation (vectoring). The model 38 will give cancelled FEXT noise, since the actual cancellation accomplished is likely to not cancel FEXT noise entirely, so a model of the expected cancellation is provided. The estimated cancelled FEXT noise will be used instead of the measured FEXT noise to estimate the effect of cancellation. The model can be constructed, for example, as described in the publication *Near-End and Far-End Crosstalk Statistical Models*, COMMITTEE T1-TELECOMMUNICATIONS T1E1.4/99-527, Working Group T1E1.4 (DSL Access), Clearwater, Fla., Dec. 6-10, 1999, employing Artificial Intelligent model instead of the mathematical model in the publication. Polynomial Fuzzy Neural Network (PFNN) is used to model vectoring scheme and Genetic Algorithms (GA) is used to optimize the model. PFNN is method to design data-driven nonlinear model. The model 38 is designed offline with noise (NEXT and FEXT), and metallic data (length and wideband longitudinal data) and binding information such as number of pairs in binding group, number of vectored lines, and co-existence of SDSL.

The input of the model 38 is NEXT noise, (estimated) FEXT noise, attenuation (by length), wideband longitudinal balance, actual FEXT cancellation by vectoring device, and number of pairs in binding group, number of vectored lines, and number of SDSL lines. The model gives estimated FEXT noise cancellation. Once the model 38 is designed, it gives FEXT Cancellation (vectoring) online with the noise and metallic data measured in steps 28, 32 and 34.

And finally, the benefit of FEXT noise cancellation, or vectoring, is evaluated and reported in step 40. The difference of bitrate with FEXT cancellation model and without the FEXT cancellation model is the benefit of the implementation of the vectoring.

Mathematical Equations of FEXT

In step 34, FEXT noise can either measured at RT side 20 with instrument 24b or can be estimated. FEXT can be estimated as an attenuated value of NEXT by length of cable. Thus, FEXT can be represented as a function of NEXT, frequency, length of cable and number of pairs in a binder. FEXT can be represented using a mathematical equation of frequency f, length d, and number of pairs in a binder n as equation (1). We use a polynomial fuzzy neural network to model FEXT accurately. FEXT is estimated with insertion loss IL, NEXT, length d, and number of pairs in a binder n as equation (2).

$$FEXT(f) = 3 \cdot 10^{-4} (n/49)^{0.6} f^2 d \quad (1)$$

$$FEXT(f) = f(IL(f,d), NEXT(f,n), d, n) \quad (2)$$

Where, insertion loss IL(f,d) can be represented in mathematical equation as in (3). Here, we use a measured value by test instrument 24c in FIG. 2.

$$IL(f) = \exp(-2kdf^{1/2}) \quad (3)$$

Polynomial Fuzzy Neural Network Optimized with Genetic Algorithm

The FEXT model in step 34 and the FEXT cancellation model in step 38 are implemented using a polynomial fuzzy neural network (PFNN). Each membership function of the fuzzy neural network is optimized with a genetic algorithm (GA). With PFNN, a nonlinear model can be driven through input-output data. GA is very effective on searching (optimizing) when function spaces are not smooth or continuous, which is the general case of nonlinear modeling.

Let's assume that the reference model can be represented in Ivahnenko polynomial [1] as in equation (4).

$$\hat{y} = f(x_1, x_2, \ldots, x_N) = w_0 + \Sigma w_1 x_1 + \Sigma w_1 x_1^2 + \Sigma w_1 x_1 x_2 + \ldots + \Sigma w_1 x_N^2 \quad (4)$$

[1] A. G. Ivahnenko, Polynomial theory of complex systems, IEEE Trans. Syst. Man Cybern., pp. 364-378, SMC-1, 1971.

Figure 4:
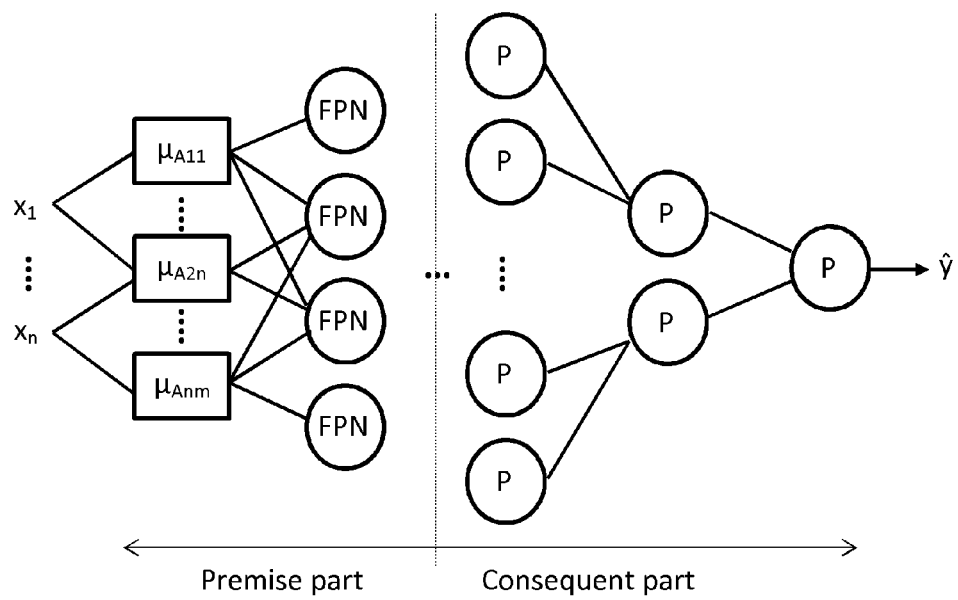
FIG. 4 is a fuzzy neural networks structure.

The equation can be represented as the fuzzy neural networks structure as in FIG. 4.

The PFNN is a feed-forward network that computes a polynomial function of a set of parallel inputs to generate an output.

The premise part in FIG. 4 is implemented by fuzzy neural networks. The inference system is implemented based on the Takagi, Sugeno, and Kang fuzzy model [2]. A polynomial neural network is employed in the defuzzification scheme to improve output performance and to select rules.

[2] M. Sugeno and G. T. Kang, "Structure identification of fuzzy model", Fuzzy Sets and Systems, vol. 28, pp. 15-33, 1988.

The input nodes (neurons) are implemented with Gaussian fuzzy membership function given by in equation (5).

$$\mu_{A^i}(x) = \exp(-(c_i - x)^2 / (2\sigma_i^2)) \quad (5)$$

where, $c_i$, and $\sigma_i$ are the center and width of the i-th fuzzy set $A^i$, respectively.

The parameters (fuzzy membership functions and weight of each node) are optimized using genetic algorithm (GA) with the mean square error criteria to minimize the difference between reference model output $\hat{y}$ and the actual output y.

The pseudo code of genetic algorithm is described below.

```
Procedure Genetic_Algorithm
{
    initialize_population
    evaluate_population
    while ( not termination_condition ) do
    {
        select_parents_for_reproduction
        crossover
        mutation
        evaluate_population
    }
}
```

The detail descriptions and algorithms of PFNN and GA can be found in the below references.

[3] Wonoh Kim, "Hierarchical Control System with Statistical Process Control and Soft Computing", Ph.D Dissertation Proposal, School of Electrical and Computer Engineering, Georgia Institute of Technology, 2000.

[4] Wonoh Kim and George Vachtsevanos, "Hierarchical Process Control by Combining SPC and Soft Computing Methods", 19th Int. Conf. of the North American Fuzzy Information Processing Society (NAFIPS 2000), pp. 485-489, 2000.

[5] Wonoh Kim et al., "Fuzzy Logic Ratio Control for a CVT Hydraulic Module", Proc. IEEE Int. Symp. on Intelligent Control, pp. 151-156, 2000.

[6] Wonoh Kim et al., "Autonomous Vehicles, From Flight Control to Mission Planning using Fuzzy Logic Techniques", 13th Int. Conf. on Digital Signal Processing Proceedings (DSP 97), vol. 2, pp. 977-981, 1997.

FEXT Cancellation Model

Vectoring can greatly improve the performance of DSL by removing the FEXT within a vectored group (self-FEXT). Yet in the reality there may be simultaneous presence of vectored and non-vectored lines and also multiple vectoring groups as existing DSL equipment is replaced with vectored DSL. Crosstalk from non-vectored lines or from lines belonging to other vectored groups within the same cable or binder (alien-FEXT) may not always be removed within a vectored group and it will degrade vectoring performance.

The suggested FEXT cancellation model in step 38 of FIG. 3 is designed with the information of which pairs will be implemented with vectoring. The model also includes existence of special pairs of HDSL (or T1), which also frequently happens in crossbox.

The FEXT cancellation model is designed with PFNN described above. The PFNN model is a data driven model, not a mathematical model and can be easily model complicated system. The model includes not only noise information (NEXT, FEXT) and metallic information (attenuation and wideband longitudinal balance) but also information of number of pairs in binding group n, number of vectored lines m (the number of non-vectored lines will be n-m), co-existence of SDSL (Symmetric DSL including T1 and HDSL) p, and band plan (profiles) to get accurate estimation of the vectoring effect.

Accordingly a method of designing reference model of vectoring effect is provided, using artificial intelligence method such as fuzzy logic, neural networks, and genetic algorithm, but not just limited on method using artificial intelligence but any realization of the data-driven model to calculate performance of vectoring.

Co-existence of vectored and non-vectored pairs in the binding group and co-existence of special lines such as Symmetric DSL including HDSL and T1 lines is also accommodated.

In accordance with the disclosure, a determination can be made as to what improvement in data rates might be achieved with implementation of vectoring.

While a preferred embodiment of the technology has been shown and described, it will be apparent to those skilled in the art that many changes and modifications may be made without departing from the broader aspects. The appended claims are therefore intended to cover all such changes and modifications as fall within the true spirit and scope of the technology.

What is claimed is:

1. An apparatus for prequalification of vectoring before implementation, comprising:
   a noise measurement apparatus for measuring overall noise and providing an FEXT noise value, wherein the FEXT noise value is a value estimated based on NEXT noise attenuated by a line length; and
   a calculator for determining bit rates with the overall noise, and the bit rates with overall noise minus the FEXT noise, wherein the calculator for determining the bit rates with overall noise minus the FEXT noise employs a model of FEXT noise cancellation.

2. The apparatus according to claim 1, wherein said calculator employs methods selected from fuzzy logic, neural networks, genetic algorithm, and realization of a data-driven model to calculate.

3. The apparatus according to claim 1, wherein the provided FEXT noise value is a measured FEXT noise value.

4. The apparatus according to claim 2, wherein said calculator factors in co-existence of vectored and non-vectored pairs in a binding group and co-existence of special lines.

5. A method for prequalification of vectoring before implementation, comprising:
   measuring overall noise on a DSL line;
   providing a value of FEXT noise on the DSL line, wherein providing the FEXT noise value comprises estimating FEXT noise value based on NEXT noise attenuated by a line length;
   subtracting the FEXT noise from the overall noise; and
   determining a bit rate with overall noise minus the FEXT noise by employing a model representing FEXT noise cancellation.

6. The method according to claim 5, wherein said determining employs methods selected from fuzzy logic, neural networks, genetic algorithm, and realization of a data-driven model to calculate.

7. The method according to claim 5, further comprising determining a bit rate with the overall noise.

8. The method according to claim 5, further comprising displaying the determined bit rate.

9. The method according to claim 5, wherein providing the FEXT noise value comprises measuring the FEXT noise value.

10. The method according to claim 6, wherein said determining factors in co-existence of vectored and non-vectored pairs in a binding group and co-existence of special lines.

11. An apparatus for prequalification of vectoring before implementation on a DSL line, comprising:
    an interface for connecting to the DSL line;
    a stimulus/response apparatus for measuring overall noise on the DSL line and providing an FEXT noise value representative of FEXT noise on the DSL line, wherein the provided FEXT noise value is a value estimated based on NEXT noise value attenuated by a line length; and
    a processor for determining a bit rate based on the overall noise minus the FEXT noise value.

12. The apparatus according to claim 11 wherein the processor further determines a bit rate based on the overall noise.

13. The apparatus according to claim 11, wherein the provided FEXT noise value is a measured FEXT noise value.

14. The apparatus according to claim 11, wherein said processor employs methods selected from fuzzy logic, neural networks, genetic algorithm, and realization of a data-driven model to calculate.

15. The apparatus according to claim 11, wherein the processor for determining the bit rates with overall noise minus the FEXT noise employs a model of FEXT noise cancellation for the determination.

16. The apparatus according to claim 14, wherein said processor factors in co-existence of vectored and non-vectored pairs in a binding group and co-existence of special lines.

* * * * *